United States Patent [19]
Suzuki

[11] Patent Number: 5,760,957
[45] Date of Patent: Jun. 2, 1998

[54] ZOOM LENS HAVING THE VIBRATION-REDUCTION FUNCTION

[75] Inventor: Kenzaburo Suzuki, Tokyo, Japan

[73] Assignee: Nikon Corporation, Tokyo, Japan

[21] Appl. No.: 597,067

[22] Filed: Feb. 5, 1996

Related U.S. Application Data

[63] Continuation of Ser. No. 269,093, Jun. 30, 1994, abandoned.

[30] Foreign Application Priority Data

Jul. 12, 1993  [JP]  Japan ................................. 5-195162

[51] Int. Cl.$^6$ ................ G02B 27/64; G02B 15/14; G02B 15/15
[52] U.S. Cl. ................ 359/557; 359/554; 359/676; 359/677; 359/683; 359/685; 359/688
[58] Field of Search ............................ 359/554, 557, 359/676, 677, 683, 685, 686, 688; 354/410

[56] References Cited

U.S. PATENT DOCUMENTS

| | | | |
|---|---|---|---|
| 5,040,881 | 8/1991 | Tsuji | 359/557 |
| 5,121,978 | 6/1992 | Maruyama | 359/557 |
| 5,223,979 | 6/1993 | Yoneyama | 359/676 |
| 5,249,079 | 9/1993 | Umeda | 359/686 |
| 5,270,857 | 12/1993 | Oizumi et al. | 359/554 |
| 5,272,564 | 12/1993 | Suzuki et al. | 359/676 |

*Primary Examiner*—James Phan
*Assistant Examiner*—Audrey Chang
*Attorney, Agent, or Firm*—Shapiro and Shapiro

[57] ABSTRACT

A zoom lens having the vibration-reduction function includes, in succession from the object side, a first lens unit having positive refractive power, a second lens unit having negative refractive power, a third lens unit having negative refractive power, and a fourth lens unit having positive refractive power. The fourth lens unit includes, in succession from the object side, a front group having positive refractive power and a rear group having positive refractive power. During the focal-length change from the wide angle end to the telephoto end, the spacing between the first lens unit and the second lens unit is increased, the spacing between the second lens unit and the third lens unit and the spacing between the third lens unit and the fourth lens unit are non-linearly varied. At least one of the third lens unit and the front group in the fourth lens unit is provided for movement in a direction substantially orthogonal to the optical axis thereof.

27 Claims, 3 Drawing Sheets

ZOOM LENS HAVING THE VIBRATION-REDUCTION FUNCTION

This is a continuation of application Ser. No. 08/269,093 filed Jun. 30, 1994, now abandoned.

BACKGROUND OF THE INVENTION

1. Field of the Invention

This invention relates to a zoom lens having the vibration-reduction function and more particularly to a vibration-reduction method for a photographic zoom lens, a video zoom lens or the like.

2. Related Background Art

U.S. Pat. No. 5,270,857 discloses a zoom lens in which any lens unit of the zoom lens comprised of two or more lens units is displaced in a direction orthogonal to the optical axis thereof to thereby effect image vibration correction, and U.S. Pat. No. 5,040,881 discloses a zoom lens in which some lens groups in a first lens unit fixed during zooming are displaced in a direction orthogonal to the optical axis thereof to thereby effect correction.

However, in the prior art as described above, a sufficient back focal length for single-lens reflex or for video cannot be secured and a desired great zoom ratio cannot be realized, and this has led to the inconvenience that these zoom lenses are unsuitable as photographic zoom lenses or video zoom lenses.

SUMMARY OF THE INVENTION

The present invention has been made in view of the above-noted problem and an object thereof is to provide a compact and high-performance zoom lens which realizes a sufficient back focal length and a great zoom ratio and which has the vibration-reduction-for-image-stabilizing function.

To achieve the above object, a zoom lens according to an embodiment of the present invention includes, in succession from the object side, a first lens unit having positive refractive power, a second lens unit having negative refractive power, a third lens unit having negative refractive power, and a fourth lens unit having positive refractive power, said fourth lens unit including, in succession from the object side, a front group having positive refractive power and a rear group having positive refractive power, during the focal-length change from the wide angle end to the telephoto end, the spacing between said first lens unit and said second lens unit being increased, the spacing between said second lens unit and said third lens unit and the spacing between said third lens unit and said fourth lens unit being non-linearly varied, at least one of said third lens unit and said front group in said fourth lens unit being provided for movement in a direction substantially orthogonal to the optical axis thereof.

Also, to achieve the above object, a zoom lens according to another embodiment of the present invention includes, in succession from the object side, a first lens unit having positive refractive power, a second lens unit having negative refractive power, a third lens unit having negative refractive power, and a fourth lens unit having positive refractive power, said fourth lens unit including, in succession from the object side, a front group having positive refractive power and a rear group having positive refractive power, during the focal-length change from the wide angle end to the telephoto end, the spacing between said first lens unit and said second lens unit being increased, the spacing between said second lens unit and said third lens unit and the spacing between said third lens unit and said fourth lens unit being non-linearly varied, said zoom lens being provided with displacing means for moving at least one of said third lens unit and said front group in said fourth lens unit in a direction substantially orthogonal to the optical axis thereof.

The present invention adopts a zoom lens having the vibration-reduction function as described above so as to be suitable for a photographic or video zoom lens.

The features and advantages of a zoom lens of such a four-unit construction type will hereinafter be described.

DETAILED DESCRIPTION OF THE INVENTION

In a zoom lens of the above-described four-unit construction type, firstly, a good imaging performance can be obtained at each focal length (i.e., at any zooming position). Further, such zoom lens has the features that the full length of the zoom lens is invariable during focal-length change and that a higher magnification is possible. Because of such excellent characteristics, the zoom lens of the above-described four-unit construction type is widely used as a photographic or video zoom lens.

The present invention has found out optimum conditions for vibration-reduction regarding the zoom lens of the above-described four-unit construction type. In other words, the zoom lens of the present invention is excellent in both of the imaging performance and the vibration-reduction performance.

Generally, in a zoom lens wherein a convex lens unit precedes, it is often the case that a first lens unit is the largest lens unit and is moved toward the object side during focusing. Therefore, selecting the first lens unit as a vibration-reduction correcting optical system displaceable in a direction orthogonal to the optical axis thereof would result in the bulkiness of a holding mechanism and a driving mechanism, and this is not preferable.

Figure 1:
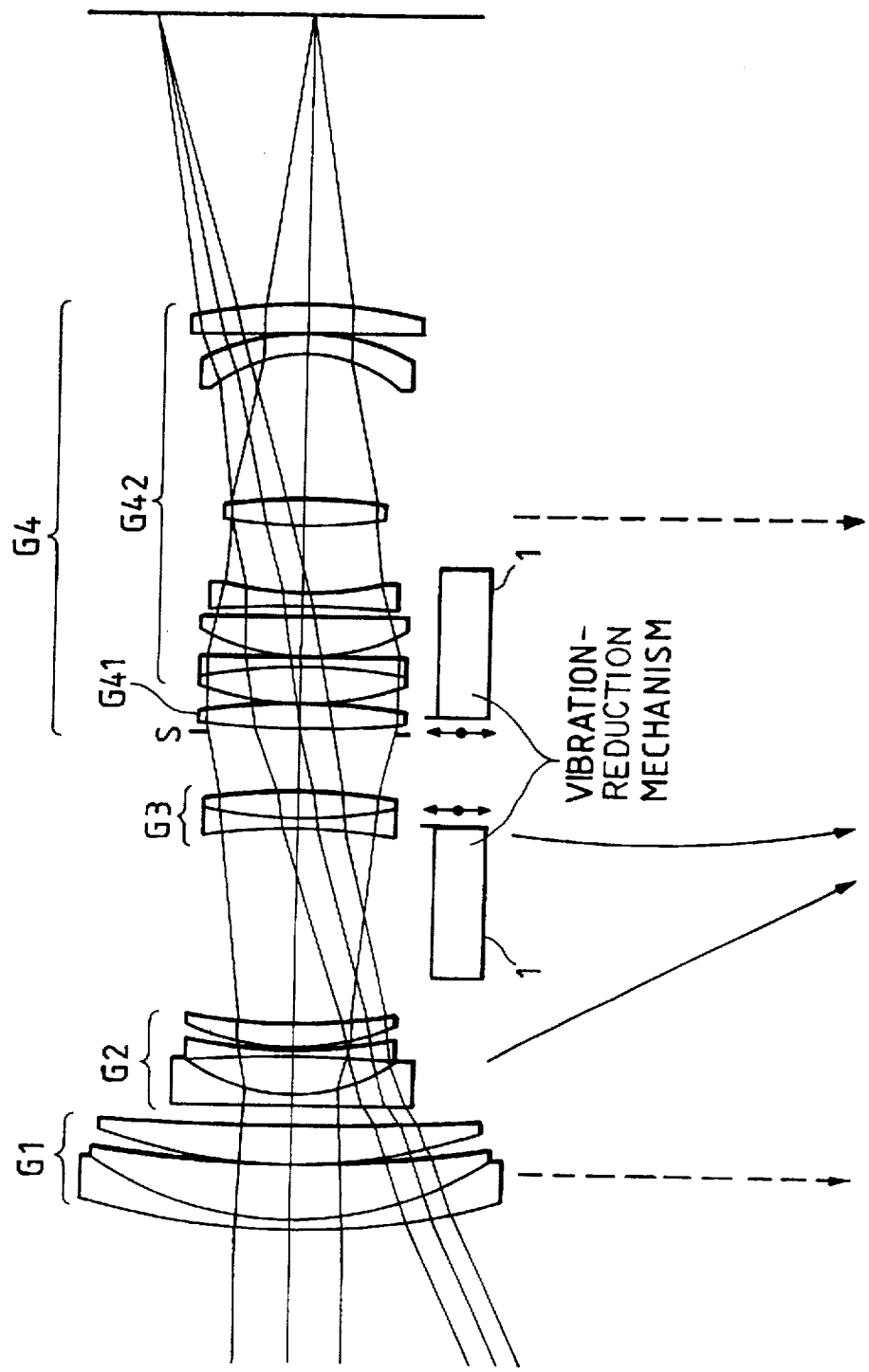
FIG. 1 shows the construction of a zoom lens according to a first embodiment of the present invention.

Accordingly, referring to FIG. 1, for example, in the zoom lens of the present invention as well, it is not preferable to make the first lens unit G1 into a vibration-reduction correcting optical system. Also, if a lens unit greatly moved along the optical axis during focal-length change like the second lens unit G2 of the present invention is selected as a vibration-reduction correcting optical system, the holding mechanism and the driving mechanism will become complicated, and this is not preferable.

So, in the present invention, for the simplification of the mechanism of the whole lens system and for a good aberration characteristic during vibration-reduction, at least one of the third lens unit G3, the front group G41 in the fourth lens unit G4, and at least one positive lens component between said third lens unit G3 and a single negative lens in said fourth lens unit G4 is selected as the vibration-reduction correcting optical system. That is, at least one of the third lens unit G3 and the front group G41 in the fourth lens unit G4, and at least one positive lens component between said third lens unit G3 and a single negative lens in said fourth lens unit G4 is suitably displaced in a direction substantially orthogonal to the optical axis by displacing means 1 which is a vibration-reduction mechanism, whereby the fluctuation of the imaging state attributable to hand shake or the like is corrected.

Also, if discretely from an aperture stop, a fixed flare stop is provided on the optical axis, any unnecessary rays of light can be intercepted when the lens unit is displaced across the optical axis for vibration-reduction, and the creation of ghost and unnecessary exposure can be obviated.

Further, in order to obtain a good imaging performance, in addition to the above-described construction of the present invention, it is preferable that said displacing means move said third lens unit in the direction substantially orthogonal to the optical axis and when the focal length of said third lens unit is f3 and the focal length of the whole zoom lens system at the wide angle end is fW and the focal length of the whole zoom lens system at the telephoto end is fT, the following condition be satisfied:

$$0.2 < |f3|/(fw \cdot fT)^{1/2} < 5 \qquad (1)$$

Alternatively, it is preferable that said displacing means moves at least one positive lens component between said third lens unit and a single negative lens in said fourth lens unit in a direction substantially orthogonal to the optical axis and when the focal length of said fourth lens unit is f4 and the focal length of at least one positive lens component between said third lens unit and a single negative lens in said fourth lens unit is $f_+$, the following condition be satisfied:

$$0.5 < f_+/f4 < 4 \qquad (2)$$

Or it is preferable that said displacing means move the front group of said fourth lens unit in the direction substantially orthogonal to the optical axis and when the focal length of said fourth lens unit is f4 and the focal length of the front group in said fourth lens unit is f41, the following condition be satisfied:

$$0.5 < f41/f4 < 4 \qquad (2a)$$

Conditional expression (1) corresponds to a case where the third lens unit G3 is selected as the vibration-reduction correcting optical system.

Conditional expression (2) corresponds to a case where at least one positive lens component between the third lens unit G3 and the single negative lens in the fourth lens unit G4 is selected as the vibration-:reduction correcting optical system. Also, conditional expression (2a) corresponds to a case where the front group G41 in the fourth lens unit G4 is selected as the vibration-reduction correcting optical system.

Conditional expression (1) prescribes the appropriate ranges of the focal length fW of the zoom lens at the wide angle end, the focal length fT of the zoom lens at the telephoto end and the focal length f3 of the third lens unit G3.

If the upper limit value of conditional expression (1) is exceeded, not only the full length will become great and it will be impossible to realize a compact zoom lens, but also the lens diameters and aperture diameters of the lenses more adjacent to the image side than the third lens unit G3 will be increased, and this is inconvenient. Also, at the telephoto end, spherical aberration will become excessively great to the negative side, and this is inconvenient.

If conversely, the lower limit value of conditional expression (1) is exceeded, the focal length f3 of the third lens unit G3 will become too small and the spherical aberration at the telephoto end will become excessively great to the positive side and the fluctuation of curvature of image field during the focal-length change by zooming will become very great, and this is inconvenient. Also, it will become difficult to secure a sufficient air spacing for focal-length change, and this is inconvenient.

If in conditional expression (1), the upper limit value is 2.5 and the lower limit value is 0.4, a better imaging performance can be obtained.

Conditional expression (2) prescribes an appropriate ratio of refractive power between the focal length $f_+$ of at least one positive lens component between the third lens unit G3 and the single negative lens in the fourth lens unit G4 and the focal length f4 of the whole fourth lens unit G4.

If the upper limit value of conditional expression (2) is exceeded, the spherical aberration at the telephoto end will become excessively great to the positive side and the full length will become great and thus, it will be impossible to realize a compact zoom lens. Further, Petzval sum will be liable to become excessively great to the positive side and therefore, astigmatism and curvature of image field will become great and a good imaging performance will not be obtained, and this is inconvenient.

If conversely, the lower limit value of conditional expression (2) is exceeded, the spherical aberration at the telephoto end will be liable to become excessively great to the negative side and the fluctuation of coma during the focal-length change by zooming will become great, and the distortion at the telephoto end will be liable to excessively shift toward the positive side, and this is inconvenient.

If in conditional expression (2), the upper limit value is 2.2 and the lower limit value is 1.0, a better imaging performance can be obtained.

Conditional expression (2a) prescribes an appropriate ratio of refractive power between the focal length f41 of the front group G41 of the fourth lens unit G4 and the focal length f4 of the whole fourth lens unit G4.

If the upper limit value of conditional expression (2a) is exceeded, the spherical aberration at the telephoto end will become excessively great to the positive side and the full length will become great and thus, it will be impossible to realize a compact zoom lens. Further, Petzval sum will be liable to become excessively great to the positive side and therefore, astigmatism and curvature of image field will become great and a good imaging performance will riot be obtained, and this is inconvenient.

If conversely, the lower limit value of conditional expression (2a) is exceeded, the spherical aberration at the telephoto end will be liable to become excessively great to the negative side and the fluctuation of coma during the focal-length change by zooming will become great, and the distortion at the telephoto end will be liable to excessively shift toward the positive side, and this is inconvenient.

If, in conditional expression (2a), the upper limit value is 2.2 and the lower limit value is 1.0, a better imaging performance can be obtained.

Further, in order to obtain a good imaging performance and a good vibration-reduction performance, it is preferable that the following conditional expressions be satisfied:

$$\Delta S3/f3| < 0.1 \qquad (3)$$
$$\Delta S41/f41| < 0.1 \qquad (4)$$
$$0.2 < R31/f3| < 2 \qquad (5)$$
$$-40 < R411/f41 < 15 \qquad (6)$$

where
f3: the focal length of the third lens unit G3;
f41: the focal length of the front group G41 in the fourth lens unit G4;

ΔS3: the magnitude of the maximum displacement of the third lens unit G3 during vibration-reduction;

ΔS41: the magnitude of the maximum displacement of the front group G41 in the fourth lens unit G4 during vibration-reduction;

R31: the radius of curvature of that surface of the third lens unit G3 which is most adjacent to the object side;

R411: the radius of curvature of that surface of the front group G41 in the fourth lens unit G4 which is most adjacent to the object side.

Conditional expressions (3) and (5) correspond to the case where the third lens unit G3 is selected as the vibration-reduction correcting optical system. Also, conditional expressions (4) and (6) correspond to the case where the front group G41 in the fourth lens unit G4 is selected as the vibration-reduction correcting optical system.

Conditional expression (3) prescribes an appropriate ratio between the magnitude ΔS3 of the maximum displacement (in the direction orthogonal to the optical axis) of the third lens unit G3 during vibration-reduction and the focal length f3 of the third lens unit G3. If the upper limit value of conditional expression (3) is exceeded, the maximum amount of displacement of the third lens unit G3 will become too great and as a result, the amount of aberration fluctuation during vibration-reduction will become great, and this is inconvenient. Particularly, in the marginal area on the image plane, the difference in the direction of the optical axis between the best image plane in the meridional direction and the best image plane in the sagittal direction will widen, and this is inconvenient. Also, in the marginal area on the image plane, astigmatic difference will become very great, and this is inconvenient.

Conditional expression (4) prescribes an appropriate ratio between the maximum amount of displacement ΔS41 of the front group G41 in the fourth lens unit G4 during vibration-reduction and the focal length f41 of the front group G41 in the fourth lens unit G4.

If the upper limit value of conditional expression (4) is exceeded, the maximum amount of displacement of the front group G41 in the fourth lens unit G4 will become too great and as a result, the amount of aberration fluctuation during vibration-reduction will become great, and this is inconvenient. Particularly, in the marginal area on the image plane, the difference in the direction of the optical axis between the best image plane in the meridional direction and the best image plane in the sagittal direction will widen, and this is inconvenient. Further, at the telephoto end, the astigmatic difference in the central area on the image plane will become very great, and this is inconvenient.

Conditional expression (5) prescribes an appropriate ratio between the radius of curvature R31 of that surface of the third lens unit G3 which is most adjacent to the object side and the focal length f3 of the third lens unit G3.

If the upper limit value of conditional expression (5) is exceeded, the distortion at the telephoto end will be liable to become excessively great to the positive side, and at the wide angle end, extroversive coma will be created in the rays of light under the principal ray of light, and this is not preferable. Also, during vibration-reduction, a good imaging performance can not be obtained.

If conversely, the lower limit value of conditional expression (5) is exceeded, the spherical aberration at the telephoto end will be liable to become excessively great to the positive side, and at the wide angle end, introversive coma will be created in the rays of light under the principal ray of light, and this is not preferable. Also, during vibration-reduction a good imaging performance can not be obtained.

If in conditional expression (5), the upper limit value is 2 and the lower limit value is 0.3, a better imaging performance can be obtained.

Conditional expression (6) prescribes an appropriate ratio between the radius of curvature R411 of that surface of the front group G41 in the fourth lens unit G4 which is most adjacent to the object side and the focal length f41 of the front group G41 in the fourth lens unit G4.

If the upper limit value of conditional expression (6) is exceeded, the spherical aberration at the telephoto end will be liable to become excessively great to the positive side, and this is inconvenient. Also, during vibration-reduction, a good imaging performance can not be obtained.

If conversely, the lower limit value of conditional expression (6) is exceeded, the spherical aberration at the telephoto end will be liable to become excessively great to the negative side, and this is inconvenient. Also, during vibration-reduction, a good imaging performance can not be obtained.

If in conditional expression (6), the upper limit value is 5 and the lower limit value is −30, a better imaging performance can be obtained.

When the third lens unit G3 is actually constructed as the vibration-reduction correcting optical system, it is preferable that in addition to the aforedescribed conditions, the following conditional expressions (7) and (8) be satisfied:

$$1.58 < N_- \qquad (7)$$

$$35 < \nu_- \qquad (8)$$

where $N_-$: the refractive index of the concave lens in the third lens unit G3 which is most adjacent to the object side;

$\nu_-$: the Abbe number of the concave lens in the third lens unit G3 which is most adjacent to the object side.

The above-mentioned refractive index and Abbe number are values for d-ray ($\lambda = 587.6$ nm).

If the lower limit value of conditional expression (7) is exceeded, the spherical aberration at the telephoto end will be liable to become excessively great to the positive side, and the fluctuations of various aberrations during focal-length change, particularly the fluctuation of distortion, will become great, and this is inconvenient. Also, Petzval sum will be liable to shift to the positive side, and this is inconvenient.

On the other hand, if the upper limit value of conditional expression (8) is exceeded, the fluctuation of chromatic aberration will become excessively great during focal-length change and it will become impossible to obtain a good imaging performance, and this is not preferable.

When the front group G41 in the fourth lens unit G4 is actually constructed as the vibration-reduction correcting optical system, it is preferable that the following conditional expressions (9) and (10) be satisfied:

$$1.5 < N_+ \qquad (9)$$

$$50 < \nu_+ \qquad (10)$$

where $N_+$: the refractive index of the convex lens in the front group G41 in the fourth lens unit G4 which is most adjacent to the object side;

$\nu_+$: the Abbe number of the convex lens in the front group G41 in the fourth lens unit G4 which is most adjacent to the object side.

If the lower limit value of conditional expression (9) is exceeded, the spherical aberration at the telephoto end will be liable to become excessively great to the negative side and Petzval sum will also be liable to shift to the positive side, and this is inconvenient.

On the other hand, if the lower limit value of conditional expression (10) is exceeded, the creation of on-axis chromatic aberration will become excessively great and it will become impossible to obtain a good imaging performance, and this is not preferable.

In order to obtain a better imaging performance, it is preferable that in addition to the aforedescribed conditions, the following conditional expressions (11) and (12) be satisfied:

$$0.15<|f2|/f1<0.6 \quad (11)$$

$$0.05<|f2|/fT<1 \quad (12)$$

If the upper limit value of conditional expression (11) is exceeded, not only at the wide angle end and the telephoto end, spherical aberration will become very great to the negative side, but also the fluctuation of coma during focal-length change will become excessively great, and this is inconvenient.

If conversely, the lower limit value of conditional expression (11) is exceeded, the astigmatic difference at the wide angle end will become great, and at the wide angle end and the telephoto end, distortion will move greatly to the positive side and Petzval sum will become liable to shift to the negative side, and this is inconvenient.

If the upper limit value of conditional expression (12) is exceeded, the distortion at the telephoto end will move greatly to the negative side and Petzval sum will become liable to shift to the positive side, and this is inconvenient.

If conversely, the lower limit value of conditional expression (12) is exceeded, not only Petzval sum will become liable to shift to the negative side, but also at the telephoto end, spherical aberration will become great to the positive side and coma will also be greatly created, and this is inconvenient.

Where the third lens unit G3 is constructed of a lens (including a cemented lens), it is desirable to form it into a meniscus shape having its concave surface of sharp curvature facing the object side so that spherical aberration may be easily corrected during focal-length change.

Further, where the front group G41 in the fourth lens unit G4 is constructed of a lens (including a cemented lens), it is desirable to form it into a shape having its convex surface of sharp curvature facing the image side so that spherical aberration may be easily corrected during focal-length change.

It is also preferable to dispose an aperture stop S near the front group G41 in the fourth lens unit G4. In fact, in the zoom lens of the present invention, the front group G41 in the fourth lens unit G4 corresponds to the substantially central position of the whole zoom lens and therefore, by disposing the aperture stop S substantially at the center of the whole system, the lens diameter can be made substantially uniform over the whole system. As a result, the bulkiness of the zoom lens can be avoided, and this is advantageous for making the zoom lens compact. This is also advantageous in aberration correction.

Further, it is desirable to dispose a flare stop FS near the vibration-reduction unit (the lens unit displaceable in the direction orthogonal to the optical axis for vibration-reduction). That is, it is desirable to position the flare stop between the vibration-reduction unit and the lens unit adjacent thereto.

DETAILED DESCRIPTION OF THE PREFERRED EMBODIMENTS

A zoom lens having the vibration-reduction function according to each embodiment of the present invention is a zoom lens provided, in succession from the object side, with a first lens unit G1 having positive refractive power, a second lens unit G2 having negative refractive power, a third lens unit G3 having negative refractive power, and a fourth lens unit G4 having positive refractive power, said fourth lens unit G4 comprising, in succession from the object side, a front group G41 having positive refractive power and a rear group G42 having positive refractive power, and wherein during the focal-length change from the wide angle end to the telephoto end, the lens units are moved so that the spacing between said first lens unit G1 and said second lens unit G2 may be increased, the spacing between said second lens unit G2 and said third lens unit G3 and the spacing between said third lens unit G3 and said fourth lens unit G4 may be nonlinearly varied, the zoom lens being provided with displacing means 1 for moving at least one of said third lens unit G3 and the front group G41 in said fourth lens unit G4 in a direction substantially orthogonal to the optical axis thereof to thereby effect vibration-reduction. Such displacing means may be the one described in commonly owned U.S. application Ser. No. 08/129,580 (CON. OF 07/853, 256).

Each embodiment of the present invention will hereinafter be described with reference to the accompanying drawings.

[Embodiment 1]

FIG. 1 shows the construction of a zoom lens according to a first embodiment of the present invention. Embodiment 1 is one in which the present invention is applied to a photographic zoom lens.

The zoom lens shown in FIG. 1 is comprised, in succession from the object side, of a first lens unit G1 comprising a cemented lens consisting of a negative meniscus lens having its convex surface facing the object side and a positive meniscus lens having its convex surface facing the object side, and a positive meniscus lens having its convex surface facing the object side, a second lens unit G2 comprising a biconcave lens, a biconcave lens and a positive meniscus lens having its convex surface facing the object side, a third lens unit G3 comprising a cemented lens consisting of a biconcave lens and a biconvex lens, and a fourth lens unit G4 comprising a biconvex lens, a cemented lens consisting of a biconvex lens and a biconcave lens, a biconvex lens, a biconcave lens, a biconvex lens, a negative meniscus lens having its concave surface facing the object side, and a biconvex lens.

In the fourth lens unit G4, the biconvex lens most adjacent to the object side constitutes a front group G41 and the remainder constitutes a rear group G42. An aperture stop S is provided between the third lens unit G3 and the fourth lens unit G4.

FIG. 1 shows the positional relations among the lens units at the wide angle end, and during the focal-length change to the telephoto end, the lens units are moved on the optical axis along zoom tracks indicated by arrows, but the first lens unit G1 and the fourth lens unit G4 are fixed in the direction of the optical axis during zooming. The third lens unit G3 or the front group G41 in the fourth lens unit G4 is suitably moved in the direction substantially orthogonal to the optical axis by an antivibration mechanism 1 which is the displacing means so that the shake of an image attributable to the vibration of the zoom lens may be corrected.

The values of the elements of Embodiment 1 of the present invention are given in Table 1 below. In Table 1, f represents the focal length, $F_{NO}$ represents F-number, 2ω represents the angle of field, and Bf represents the back focal length. Further, the numbers at the left end indicate the order of the lens surfaces from the object side. r indicates the radius of curvature of each lens surface, d indicates the spacing between adjacent lens surfaces, n indicates the refractive index for d-ray ($\lambda=587.6$ nm), and ν indicates the Abbe number for d-ray ($\lambda=587.6$ nm).

Also, vibration-reduction data show a case where the third lens unit G3 is selected as a vibration-reduction correcting optical system and a case where the front group G41 in the fourth lens unit G4 is selected as the vibration-reduction correcting optical system.

TABLE 1 f = 51.4–131.5
$F_{NO}$ = 3.50–3.51
2ω = 47.26°–18.06°

| | r | d | ν | n |
|---|---|---|---|---|
| 1 | 94.491 | 1.700 | 26.35 | 1.80518 |
| 2 | 48.975 | 8.000 | 57.53 | 1.67025 |
| 3 | 210.967 | 0.100 | | |
| 4 | 75.858 | 5.000 | 47.07 | 1.67003 |
| 5 | 711.073 | (d5 = variable) | | |
| 6 | −685.698 | 1.250 | 55.60 | 1.69680 |
| 7 | 22.818 | 5.000 | | |
| 8 | −167.967 | 1.1500 | 47.47 | 1.78797 |
| 9 | 87.063 | 0.500 | | |
| 10 | 35.974 | 3.100 | 25.35 | 1.80518 |
| 11 | 178.497 | (d11 = variable) | | |
| 12 | −51.445 | 1.200 | 47.07 | 1.67003 |
| 13 | 76.788 | 2.950 | 32.17 | 1.67270 |
| 14 | −171.013 | (d14 = variable) | | |
| 15 | 182.170 | 3.250 | 53.93 | 1.71300 |
| 16 | −62.274 | 0.100 | | |
| 17 | 53.400 | 5.000 | 60.69 | 1.56384 |
| 18 | −69.343 | 1.100 | 40.90 | 1.79631 |
| 19 | 264.636 | 0.100 | | |
| 20 | 24.845 | 5.600 | 58.90 | 1.51823 |
| 21 | −892.532 | 1.000 | | |
| 22 | −257.253 | 2.000 | 28.56 | 1.79504 |
| 23 | 38.392 | 10.150 | | |
| 24 | 117.099 | 3.000 | 64.10 | 1.51600 |
| 25 | −98.961 | 20.850 | | |
| 26 | −18.176 | 2.000 | 47.07 | 1.67003 |
| 27 | −31.730 | 0.100 | | |
| 28 | 800.124 | 4.550 | 41.96 | 1.66755 |
| 29 | −66.515 | (Bf) | | |

(Variable spacings during focal-length change)

| f | 51.350 | 131.500 |
|---|---|---|
| D0 | ∞ | ∞ |
| d5 | 2.992 | 35.463 |
| d11 | 27.690 | 2.814 |
| d14 | 9.813 | 2.218 |
| Bf | 40.000 | 40.000 |

(Condition-corresponding values)

f3 = −112
f4 = 38.922
f41 = 65.452
fW = 51.35
fT = 131.5
ΔS3 = 0.5
ΔS41 = 0.25
R31 = −51.445
R411 = 182.17
(1) |f3|/(fW · fT)$^{1/2}$ = 1.36297
(2) f41/f4 = 1.6816
(3) ΔS3/|f3| = 0.00446
(4) ΔS41/f41 = 0.00382
(5) R31/|f3| = 0.4593
(6) R411/f41 = 2.7833
(7) N_ = 1.67003
(8) ν_ = 47.07
(9) N_+ = 1.71300

TABLE 1-continued f = 51.4–131.5
$F_{NO}$ = 3.50–3.51
2ω = 47.26°–18.06°

(10) ν_+ = 53.93
(11) |f2|/f1 = 0.3938
(12) |f2|/fT = 0.2889

(Vibration-reduction data)

| | wide angle end | telephoto end |
|---|---|---|
| amount of movement of 3rd lens unit in the direction orthogonal to optical axis (mm) | 0.5 | 0.5 |
| amount of movement of image (mm) | −0.31707 | −0.36193 |
| amount of movement of the front group in 4th lens unit in the direction orthogonal to optical axis (mm) | 0.25 | 0.25 |
| amount of movement of image (mm) | 0.34631 | 0.34631 |

[Embodiment 2]

Figure 2:
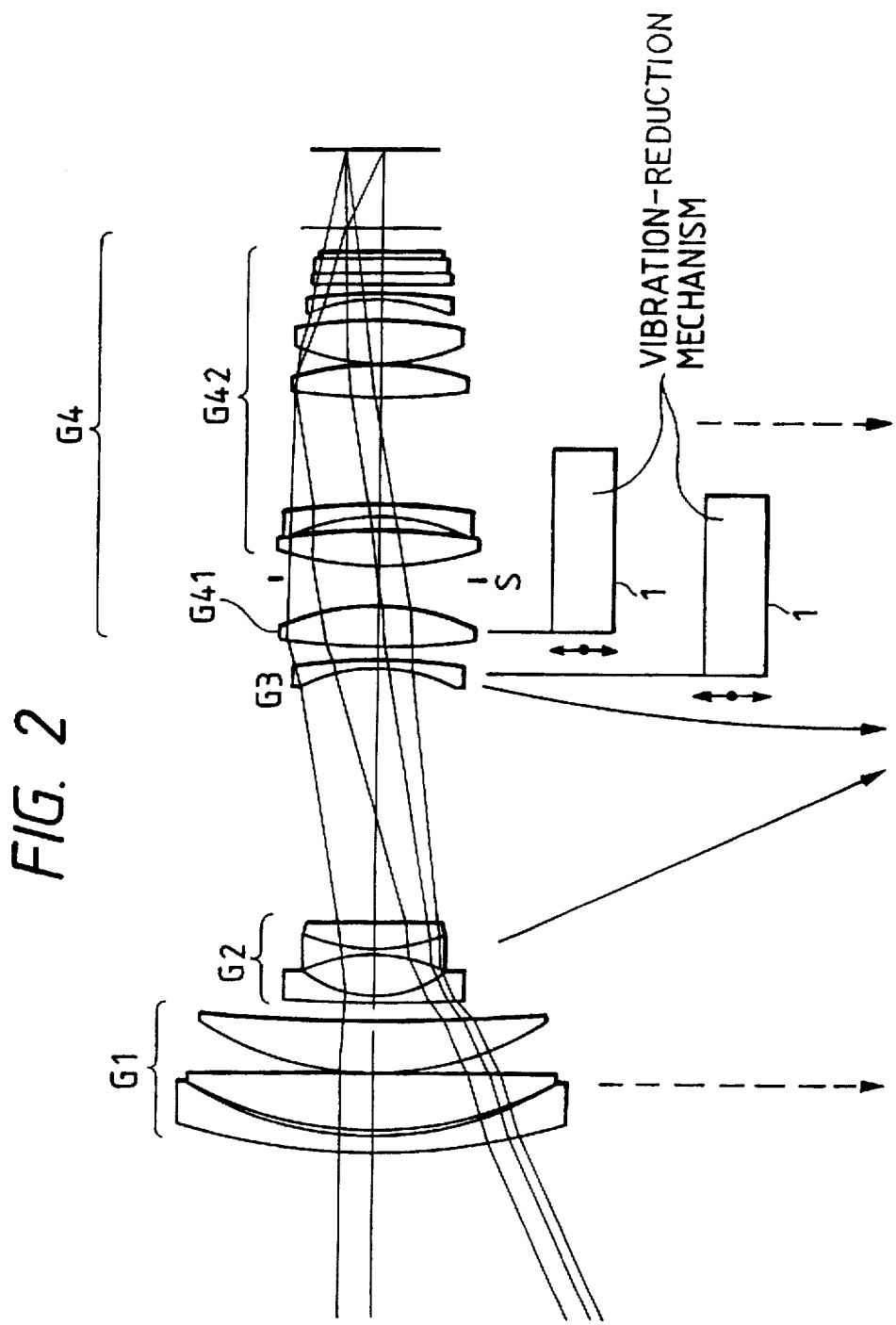
FIG. 2 shows the construction of a zoom lens according to a second embodiment of the present invention.

FIG. 2 shows the construction of a zoom lens according to a second embodiment of the present invention. Embodiment 2 is one in which the present invention is applied to a video zoom lens.

The zoom lens shown in FIG. 2 is comprised, in succession from the object side, of a first lens unit G1 comprising a negative meniscus lens having its convex surface facing the object side, a positive meniscus lens having its convex surface facing the object side and a positive meniscus lens having its convex surface facing the object side, a second lens unit G2 comprising a cemented lens consisting of a negative meniscus Lens having its convex surface facing the object side, a biconvex lens, a biconcave lens and a positive meniscus lens having its convex surface facing the object side, a third lens unit G3 comprising a negative meniscus lens having its concave surface facing the object side, and a fourth lens unit G4 comprising a biconvex lens, a biconvex lens, a negative meniscus lens having its concave surface facing the object side, a biconvex lens, a biconvex lens, a negative meniscus lens having its concave surface facing the object side and three filters.

In the fourth lens unit G4, the biconvex lens most adjacent to the object side constitutes a front group G41 and the remainder constitutes a rear group G42. An aperture stop S is provided between the front group G41 and the rear group G42.

FIG. 2 shows the positional relations among the lens units at the wide angle end, and during the focal-length change to the telephoto end, the lens units are suitably moved on the optical axis along zoom tracks, but the first lens unit G1 and the fourth lens unit G4 are fixed in the direction of the optical axis during zooming, and the third lens unit G3 or the front group G41 in the fourth lens unit G4 is suitably moved in a direction substantially orthogonal to the optical axis by a vibration-reduction mechanism 1 so that the shake of an image attributable to the vibration of the zoom lens may be corrected.

The zoom lens of Embodiment 2 is of a construction similar to that of the above-described zoom lens of Embodiment 1, and the basic difference therebetween is that Embodiment 1 is applied to a photographic zoom lens, whereas the present embodiment is applied to a video zoom lens. Also, the refractive power and shape of each lens unit differ from those in Embodiment 1.

The values of the elements of Embodiment 2 of the present invention are given in Table 2 below. In Table 2, f represents the focal length, $F_{NO}$ represents F-number, $2\omega$ represents the angle of field, and Bf represents the back focal length. Further, the numbers at the left end indicate the order of the lens surfaces from the object side, r indicates the radius of curvature of each lens surface, d indicates the spacing between adjacent lens surfaces, n indicates the refractive index for d-ray ($\lambda$=587.6 nm), and $\nu$ indicates the Abbe number for d-ray ($\lambda$=587.6 nm).

TABLE 2 f = 9.53–53.07
$F_{NO}$ = 1.28–1.41
$2\omega$ = 48.6°–8.48°

| | r | d | v | n |
|---|---|---|---|---|
| 1 | 83.572 | 1.773 | 25.46 | 1.80575 |
| 2 | 41.943 | 0.421 | | |
| 3 | 45.154 | 6.359 | 61.24 | 1.58867 |
| 4 | −1744.713 | 0.101 | | |
| 5 | 35.989 | 6.007 | 61.24 | 1.58876 |
| 6 | 340.671 | (d6 = variable) | | |
| 7 | 113.711 | 0.927 | 61.24 | 1.58946 |
| 8 | 13.304 | 4.590 | | |
| 9 | −20.221 | 0.992 | 48.50 | 1.69689 |
| 10 | 17.723 | 2.989 | 25.46 | 1.80546 |
| 11 | 450.398 | (d11 = variable) | | |
| 12 | −21.232 | 0.948 | 38.02 | 1.60312 |
| 13 | −70.944 | (d13 = variable) | | |
| 14 | 113.777 | 3.927 | 53.93 | 1.71292 |
| 15 | −26.415 | 4.985 | | |
| 16 | 34.378 | 3.936 | 44.87 | 1.71272 |
| 17 | −55.061 | 1.364 | | |
| 18 | −23.070 | 1.020 | 25.46 | 1.80520 |
| 19 | −169.207 | 13.230 | | |
| 20 | 77.934 | 3.785 | 64.14 | 1.51679 |
| 21 | −27.003 | 0.280 | | |
| 22 | 24.624 | 4.996 | 64.14 | 1.51695 |
| 23 | −38.639 | 1.850 | | |
| 24 | −23.493 | 1.035 | 25.46 | 1.84692 |
| 25 | −61.252 | 0.920 | | |
| 26 | ∞ | 1.352 | 70.70 | 1.54440 |
| 27 | ∞ | 1.646 | 64.10 | 1.51680 |
| 28 | ∞ | 0.527 | 70.70 | 1.54440 |
| 29 | ∞ | 2.638 | 70.70 | 1.54440 |
| 30 | ∞ | (Bf) | | |

(Variable spacings during focal-length change)

| f | 9.533 | 53.067 |
|---|---|---|
| D0 | ∞ | ∞ |
| d6 | 1.800 | 27.720 |
| d11 | 28.890 | 3.580 |
| d13 | 1.900 | 1.640 |
| Bf | 8.780 | 8.735 |

(Condition-corresponding values)

f3 = −50.603
f4 = 24.536
f41 = 30.425
fW = 9.533
fT = 53.067
ΔS3 = 0.5
ΔS41 = 0.3
R31 = −21.232
R411 = 113.777

(1) $|f3|/(fW \cdot fT)^{1/2}$ = 2.250
(2) f41/f4 = 1.240
(3) ΔS3/|f3| = 0.00988
(4) ΔS41/f41 = 0.00986

TABLE 2-continued f = 9.53–53.07
$F_{NO}$ = 1.28–1.41
$2\omega$ = 48.6°–8.48°

| (5) | R31/|f3| = 0.4196 |
| (6) | R411/f41 = 3.740 |
| (7) | N_ = 1.60312 |
| (8) | ν_ = 38.02 |
| (9) | N_+ = 1.71292 |
| (10) | ν_+ = 53.93 |
| (11) | |f2|/f1 = 0.2469 |
| (12) | |f2|/fT = 0.2532 |

(Vibration-reduction data)

| | wide angle end | telephoto end |
|---|---|---|
| amount of movement of 3rd lens unit in the direction orthogonal to optical axis (mm) | 0.5 | 0.5 |
| amount of movement of image (mm) | −0.21254 | −0.21474 |
| amount of movement of the front group in 4th lens unit in the direction orthogonal to optical axis (mm) | 0.3 | 0.3 |
| amount of movement of image (mm) | 0.2503 | 0.2503 |

[Embodiment 3]

Figure 3:
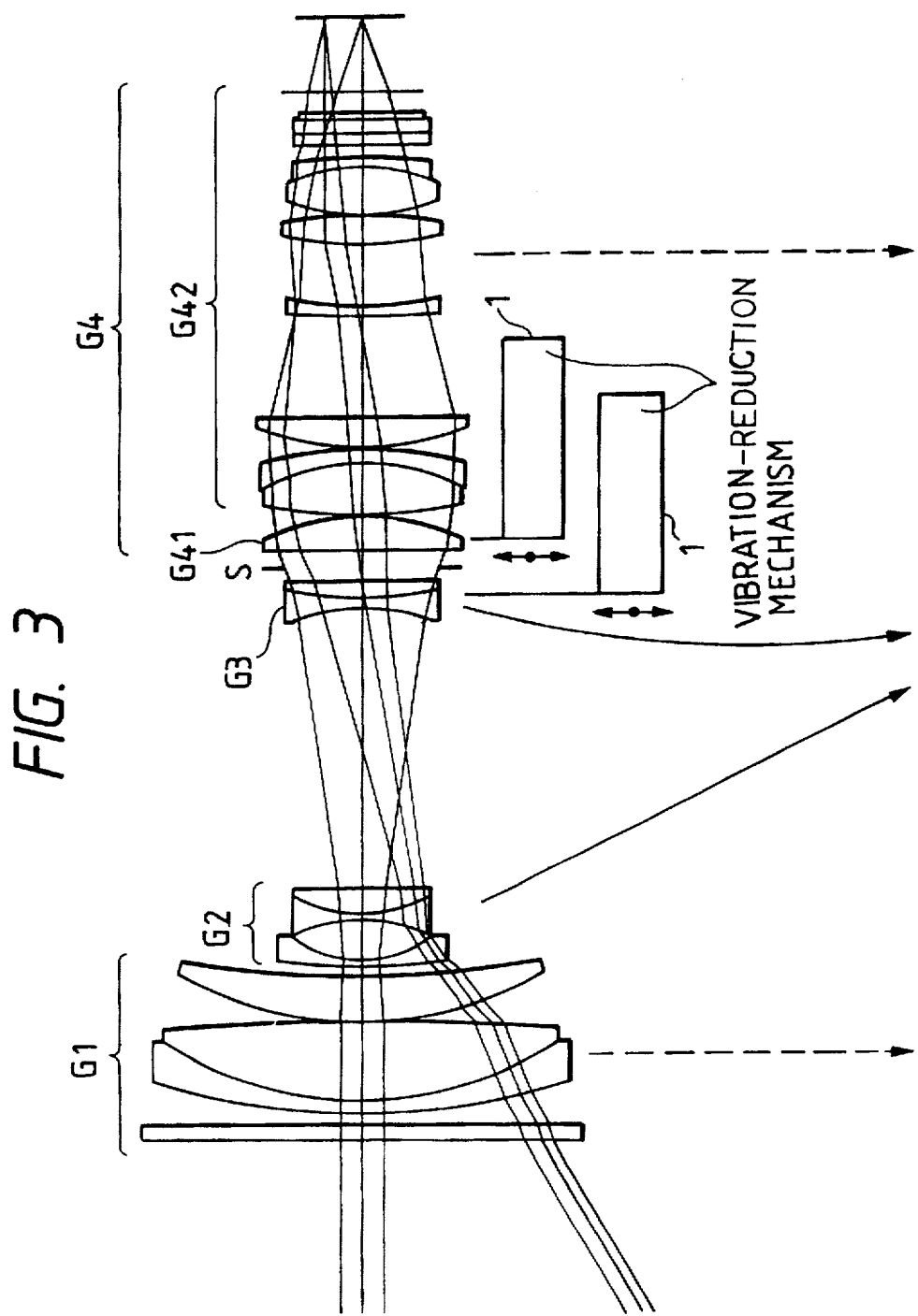
FIG. 3 shows the construction of a zoom lens according to a third embodiment of the present invention.

FIG. 3 shows the construction of a zoom lens according to a third embodiment of the present invention. Embodiment 3 is one in which the present invention is applied to a video zoom lens.

The zoom lens shown in FIG. 3 is comprised, in succession from the object side, of a first lens unit G1 comprising a filter, a cemented lens consisting of a negative meniscus lens having its convex surface facing the object side and a biconvex lens, and a positive meniscus lens having its convex surface facing the object side, a second lens unit G2 comprising a negative meniscus lens having its convex surface facing the object side, and a cemented lens consisting of a biconcave lens and a positive meniscus lens having its convex surface facing the object side, a third lens unit G3 comprising a cemented lens consisting of a biconcave lens and a biconvex lens, and a fourth lens unit G4 comprising a positive meniscus lens having its concave surface facing the object side, a cemented lens consisting of a biconvex lens and a negative meniscus lens having its concave surface facing the object side, a positive meniscus lens having its convex surface facing the object side, a negative meniscus lens having its convex surface facing the object side, a biconvex lens, a cemented lens consisting of a biconvex lens and a negative meniscus lens having its concave surface facing the object side, and three filters.

In the fourth lens unit G4, the positive meniscus lens most adjacent to the object side constitutes a front group G41 and the remainder constitutes a rear group G42. An aperture stop S is provided between the third lens unit G3 and the fourth lens unit G4.

FIG. 3 shows the positional relations among the lens units at the wide angle end, and during the focal-length change to the telephoto end, the lens units are suitably moved on the optical axis thereof along zoom tracks, but the first lens unit G1 and the fourth lens unit G4 are fixed during zooming, and the third lens unit G3 or the front group G41 in the fourth lens unit G4 is suitably moved in a direction substantially orthogonal to the optical axis by vibration-reduction mechanism 1 so that the shake of an image attributable to the vibration of the zoom lens may be corrected.

The zoom lens of Embodiment 3 is basically of a construction similar to that of the above-described zoom lens of Embodiment 2, but differs in the refractive power and shape of each lens unit from the zoom lens of Embodiment 2.

The values of the elements of Embodiment 3 of the present invention are given in Table 3 below. In Table 3, f represents the focal length, $F_{NO}$ represents F-number, $2\omega$ represents the angle of field, and Bf represents the back focal length. Further, the numbers at the left end indicate the order of the lens surfaces from the object side, r indicates the radius of curvature of each lens surface, d indicates the spacing between adjacent lens surfaces, n indicates the refractive index for d-ray ($\lambda$=587.6 nm), and v indicates the Abbe number for d-ray ($\lambda$=587.6 nm).

TABLE 3 f = 7.69–73.13
$F_{NO}$ = 1.60–1.77
$2\omega$ = 59.48°–6.2°

| | r | d | v | n |
|---|---|---|---|---|
| 1 | ∞ | 2.000 | 64.20 | 1.51872 |
| 2 | ∞ | 1.200 | | |
| 3 | 76.546 | 1.400 | 25.46 | 1.81265 |
| 4 | 38.495 | 9.200 | 61.24 | 1.59142 |
| 5 | −219.214 | 0.100 | | |
| 6 | 37.458 | 5.300 | 61.24 | 1.59142 |
| 7 | 138.413 | (d7 = variable) | | |
| 8 | 67.789 | 1.000 | 46.51 | 1.80832 |
| 9 | 12.269 | 4.500 | | |
| 10 | −15.423 | 0.900 | 58.44 | 1.65426 |
| 11 | 16.763 | 2.800 | 23.83 | 1.85504 |
| 12 | 439.448 | (d12 = variable) | | |
| 13 | −22.377 | 0.900 | 43.93 | 1.79015 |
| 14 | 33.836 | 2.200 | 25.46 | 1.81265 |
| 15 | −241.246 | (d15 = variable) | | |
| 16 | −1049.173 | 3.800 | 56.04 | 1.57125 |
| 17 | −23.001 | 0.100 | | |
| 18 | 45.246 | 6.200 | 47.18 | 1.54344 |
| 19 | −18.067 | 1.000 | 23.83 | 1.85504 |
| 20 | −51.520 | 0.100 | | |
| 21 | 22.017 | 4.000 | 64.20 | 1.51872 |
| 22 | 675.850 | 11.500 | | |
| 23 | 109.126 | 1.000 | 37.35 | 1.83930 |
| 24 | 25.782 | 2.934 | | |
| 25 | 43.964 | 3.000 | 47.18 | 1.54344 |
| 26 | −59.398 | 0.100 | | |
| 27 | 17.880 | 5.700 | 64.20 | 1.51872 |
| 28 | −16.192 | 1.000 | 37.35 | 1.83930 |
| 29 | −101.834 | 1.700 | | |
| 30 | ∞ | 1.350 | 70.70 | 1.54622 |
| 31 | ∞ | 1.650 | 64.20 | 1.51872 |
| 32 | ∞ | 0.530 | 70.70 | 1.54622 |
| 33 | ∞ | 2.640 | 70.70 | 1.54622 |
| 34 | ∞ | (Bf) | | |

(Variable spacings during focal-length change)

| f | 7.688 | 73.125 |
|---|---|---|
| D0 | ∞ | ∞ |
| d7 | 0.981 | 30.519 |
| d12 | 32.678 | 3.196 |
| d15 | 3.422 | 3.366 |
| Bf | 8.567 | 8.567 |

(Condition-corresponding values)

f3 = −32.191
f4 = 20.781
f41 = 41.111
fW = 7.688

TABLE 3-continued f = 7.69–73.13
$F_{NO}$ = 1.60–1.77
$2\omega$ = 59.48°–6.2°

| | fT = | 73.125 |
|---|---|---|
| | $\Delta$S3 = | 0.5 |
| | $\Delta$S41 = | 0.5 |
| | R31 = | −22.377 |
| | R411 = | −1049.173 |
| (1) | $lf3l/(fW \cdot fT)^{1/2}$ = | 1.358 |
| (2) | f41/f4 = | 1.978 |
| (3) | $\Delta$S3/lf3l = | 0.0155 |
| (4) | $\Delta$S41/f41 = | 0.0122 |
| (5) | R31/lf3l = | 0.6951 |
| (6) | R411/f41 = | −25.520 |
| (7) | N_ = | 1.79015 |
| (8) | v_ = | 43.93 |
| (9) | N_+ = | 1.57125 |
| (10) | v_+ = | 56.04 |
| (11) | lf2l/f1 = | 0.2031 |
| (12) | lf2l/fT = | 0.1467 |

(Vibration-reduction data)

| | wide angle end | telephoto end |
|---|---|---|
| amount of movement of 3rd lens unit in the direction orthogonal to optical axis (mm) | 0.5 | 0.5 |
| amount of movement of image (mm) | −0.35637 | −0.35738 |
| amount of movement of the front group in 4th lens unit in the direction orthogonal to optical axis (mm) | 0.5 | 0.5 |
| amount of movement of image (mm) | 0.38947 | 0.38947 |

In the present embodiment, there has been shown by way of example a case where one of the third lens unit G3 and the front group G41 in the fourth lens unit G4 is suitably moved in the direction substantially orthogonal to the optical axis by the vibration-reduction mechanism 1 to thereby correct the shake of the image attributable to the vibration of the zoom lens, but it is apparent that the operational effect of the present invention will also be achieved if both of the third lens unit G3 and the front group G41 in the fourth lens unit G4 are moved in the direction orthogonal to the optical axis as the vibration-reduction correcting optical system. While two vibration-reduction mechanisms 1 are shown in each of FIGS. 1 to 3, at least one vibration-reduction mechanism 1 can be provided in each embodiment.

As described above, according to each embodiment of the present invention, there can be provided a zoom lens which can realize a sufficient back focal length and a great zoom ratio, which is compact and has a high-performance vibration-reduction function, and is suitable for photographing, video, etc.

What is claimed is:

1. A zoom lens having the vibration-reduction function including, in succession from an object side:

a first lens unit having positive refractive power, a second lens unit having negative refractive power, a third lens unit having negative refractive power, and a fourth lens unit having positive refractive power, said fourth lens unit including, in succession from the object side, a front group having positive refractive power and a rear group having positive refractive power, during the focal length change from the wide angle end to the telephoto end, the spacing between said first lens unit and said second lens unit being increased, the spacing between said second lens unit and said third lens unit and the spacing between said third lens unit and said fourth lens unit being non-linearly varied, wherein said third lens unit is provided for movement in a direction substantially orthogonal to the optical axis thereof, and when the focal length of said third lens unit is f3 and the magnitude of the maximum displacement of said third lens unit during vibration-reduction is ΔS3, the following condition is satisfied:

$$\Delta S3/|f3|<0.1.$$

2. A zoom lens having the vibration-reduction function according to claim 1, wherein when the focal length of the whole zoom lens system at the wide angle end is fW and the focal length of the whole zoom lens system at the telephoto end is fT, the following condition is satisfied:

$$0.2<|f3|/(fW\cdot fT)^{1/2}<5.$$

3. A zoom lens having the vibration-reduction function according to claim 1, wherein when the radius of curvature of that surface of said third lens unit which is most adjacent to the object side is R31, the following condition is satisfied:

$$0.2<R31/|f3|<5.$$

4. A zoom lens having the vibration-reduction function according to claim 1, wherein when the refractive index of a concave lens in said third lens unit which is most adjacent to the object side is $N_-$ and the Abbe number of the concave lens in said third lens unit which is most adjacent to the object side is $v_-$, the following conditions are satisfied:

$$1.58<N_-$$

$$35<v_-.$$

5. A zoom lens having the vibration-reduction function according to claim 1, having on the optical axis a fixed flare stop for intercepting any unnecessary ray of light created when said third lens unit is moved along the direction substantially orthogonal to the optical axis.

6. A zoom lens having the vibration-reduction function according to claim 5, wherein said fixed flare stop is disposed between the third lens unit moved in the direction substantially orthogonal to the optical axis and a lens unit adjacent thereof.

7. A zoom lens having the vibration reduction function according to claim 1, wherein said third lens unit comprises a negative meniscus lens having its concave surface facing the object side.

8. A zoom lens having the vibration-reduction function according to claim 1, wherein an aperture stop is provided between said third lens unit and said fourth lens unit or between the front group and the rear group in said fourth lens unit.

9. A zoom lens having the vibration-reduction function according to claim 1, wherein said movement in a direction substantially orthogonal to the optical axis is limited to linear movement for correcting image vibration.

10. A zoom lens having the vibration-reduction function according to claim 1, wherein when the focal length of said first lens unit is f1 and the focal length of said second lens unit is f2 and the focal length of the whole zoom lens system at the telephoto end is fT, the following conditions are satisfied:

$$0.15<|f2|/f1<0.6$$

$$0.05<|f2|/fT<4.$$

11. A zoom lens having the vibration-reduction function including, in succession from an object side:

a first lens unit having positive refractive power, a second lens unit having negative refractive power, a third lens unit having negative refractive power, and a fourth lens unit having positive refractive power, said fourth lens unit including, in succession from the object side, a front group having positive refractive power and a rear group having positive refractive power, during the focal length change from the wide angle end to the telephoto end, the spacing between said first lens unit and said second lens unit being increased, the spacing between said second lens unit and said third lens unit and the spacing between said third lens unit and said fourth lens unit being non-linearly varied, wherein said front group in said fourth lens unit is provided for movement in a direction substantially orthogonal to the optical axis thereof, and when the focal length of the front group in said fourth lens unit is f41 and the magnitude of the maximum displacement of the front group in said fourth lens unit during vibration-reduction is ΔS41, the following condition is satisfied:

$$\Delta S41/f41<0.1.$$

12. A zoom lens having the vibration-reduction function according to claim 11, wherein when the focal length of said fourth lens unit is f4, the following condition is satisfied:

$$0.5<f41/f4<4.$$

13. A zoom lens having the vibration-reduction function according to claim 11, wherein when the radius of curvature of that surface of the front group in said fourth lens unit which is most adjacent to the object side is R411, the following condition is satisfied:

$$-40<R411/f41<15.$$

14. A zoom lens having the vibration-reduction function according to claim 11, wherein when the refractive index of a convex lens in the front group in said fourth lens unit which is most adjacent to the object side is $N_+$ and the Abbe number of the convex lens in the front group in said fourth lens unit which is most adjacent to the object side is $v_+$, the following conditions are satisfied:

$$1.5<N_+$$

$$50<v_+.$$

15. A zoom lens having the vibration-reduction function according to claim 11, wherein when the focal length of said first lens unit is f1 and the focal length of said second lens unit is f2 and the focal length of the whole zoom lens system at the telephoto end is fT, the following conditions are satisfied:

$$0.15<|f2|/f1<0.6$$

$$0.05<|f2|/fT<4.$$

16. A zoom lens having the vibration-reduction function according to claim 1, wherein the front group in said fourth lens unit comprises only a positive lens having its convex surface of sharp curvature facing the image side.

17. A zoom lens having the vibration-reduction function according to claim 5, wherein said moving in a direction substantially orthogonal to the optical axis is limited to linear movement for correcting image vibration.

18. A zoom lens having the vibration-reduction function according to claim 11, having on the optical axis a fixed flare stop for intercepting any unnecessary ray of light created when said front group in said fourth lens unit is moved along the direction substantially orthogonal to the optical axis.

19. A zoom lens having the vibration-reduction function according to claim 18, wherein said flare stop is disposed between said front group in said fourth lens unit and a lens unit adjacent thereto.

20. A zoom lens having the vibration-reduction function including, in succession from an object side:

a first lens unit fixed with respect to the direction of the optical axis thereof and having positive refractive power;

a second lens unit having negative refractive power;

a third lens unit having negative refractive power; and a fourth lens unit fixed with respect to the direction of the optical axis thereof and having positive refractive power, during the focal length change from the wide angle end to the telephoto end, said second lens unit being moved toward an image side, and said third lens unit being moved non-linearly, said third lens unit being provided for movement in a direction substantially orthogonal to the optical axis thereof, wherein, when the focal length of said third lens unit is f3 and the magnitude of the maximum displacement of said third lens unit during vibration-reduction is $\Delta S3$, the following condition is satisfied:

$$\Delta S3/|f3|<0.1.$$

21. A zoom lens having the vibration-reduction function according to claim 20, wherein, when the focal length of the whole zoom lens system at the wide angle end is fW and the focal length of the whole zoom lens system at the telephoto end is fT, the following condition is satisfied:

$$0.2<|f3|/(fW \cdot fT)^{1/2}<5.$$

22. A zoom lens having the vibration-reduction function according to claim 20, wherein, when the radius of curvature of that surface of said third lens unit which is most adjacent to the object side is R31, the following condition is satisfied:

$$0.2<R31/|f3|<5.$$

23. A zoom lens having the vibration-reduction function according to claim 20, wherein, when the refractive index of the concave lens in said third lens unit which is most adjacent to the object side is $N_-$ and the Abbe number of the concave lens in said third lens unit which is most adjacent to the object side is $v_-$, the following conditions are satisfied:

$$1.58<N_-$$

$$35<v_-.$$

24. A zoom lens having the vibration-reduction function including, in succession from an object side:

a first lens unit fixed with respect to the direction of the optical axis thereof and having positive refractive power;

a second lens unit having negative refractive power;

a third lens unit having negative refractive power; and a fourth lens unit fixed with respect to the direction of the optical axis thereof and having positive refractive power, during the focal length change from the wide angle end to the telephoto end, said second lens unit being moved toward an image side, and said third lens unit being moved non-linearly, a portion of said fourth lens unit being provided for movement in a direction substantially orthogonal to the optical axis thereof, wherein a front group in said fourth lens unit is provided for movement along the direction substantially orthogonal to the optical axis, and when the focal length of the front group in said fourth lens unit is f41 and the magnitude of the maximum displacement of the front group in said fourth lens unit during vibration-reduction is $\Delta S41$, the following condition is satisfied:

$$\Delta S41/|f41|<0.1.$$

25. A zoom lens having the vibration-reduction function according to claim 24, wherein, when the focal length of said fourth lens unit is f4, the following condition is satisfied:

$$0.5<f41/f4<4.$$

26. A zoom lens having the vibration-reduction function according to claim 24, wherein, when the radius of curvature of that surface of the front group in said fourth lens unit which is most adjacent to the object side is R411, the following condition is satisfied:

$$-40<R411/f41<15.$$

27. A zoom lens having the vibration-reduction function according to claim 29, wherein, when the refractive index of the convex lens in the front group in said fourth lens unit which is most adjacent to the object side is $N_+$ and the Abbe number of the convex lens in the front group in said fourth lens unit which is most adjacent to the object side is $v_+$, the following conditions are satisfied:

$$1.5<N_+$$

$$50<v_+.$$

* * * * *